(No Model.)
E. WESTON.
ELECTRICAL MEASURING INSTRUMENT.
No. 494,828. Patented Apr. 4, 1893.
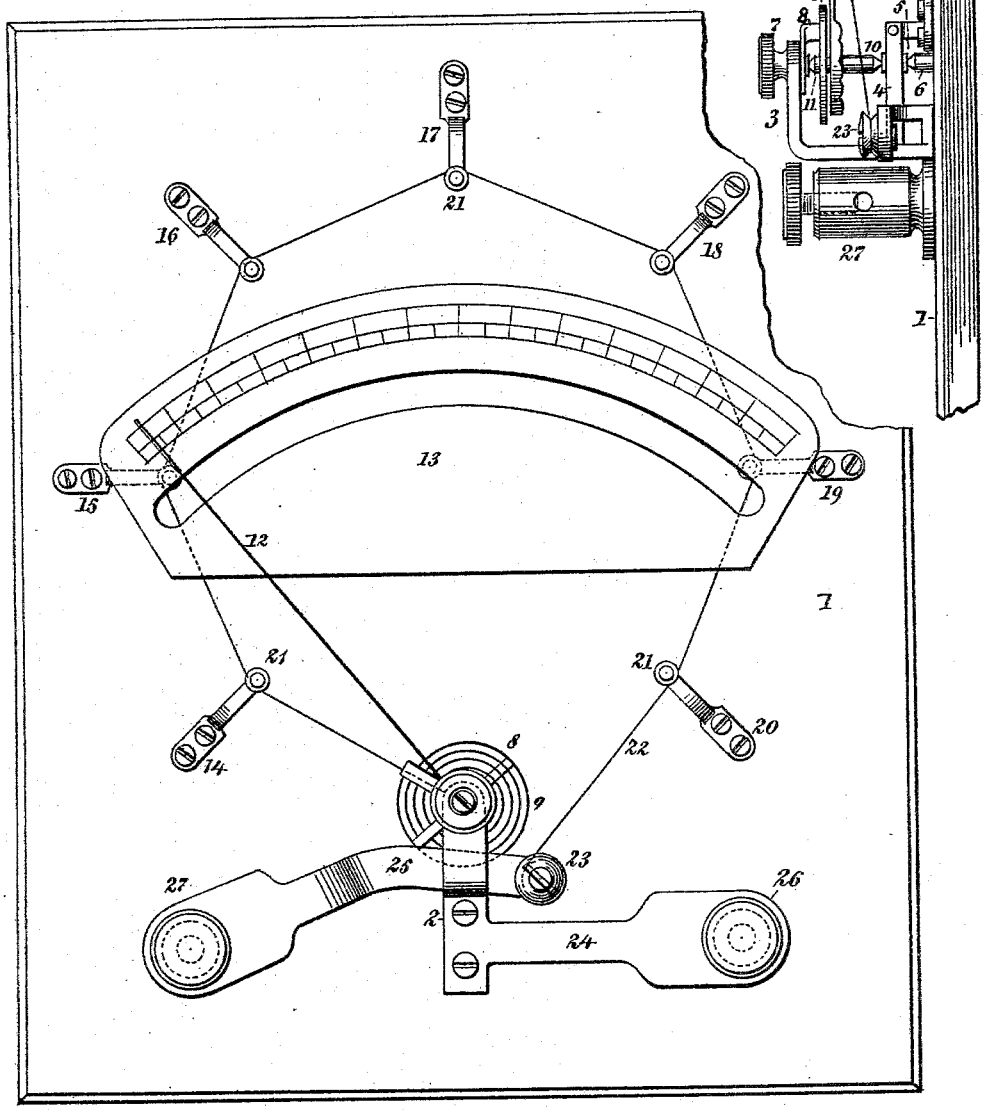
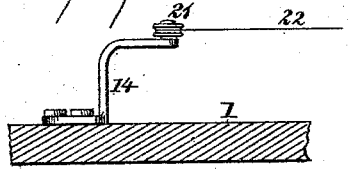
WITNESSES:
Gustave Dieterich
H. R. Moller
INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 494,828, dated April 4, 1893.

Application filed January 14, 1892. Serial No. 418,098. (No model.)

*To all whom it may concern:*

Be it known that I EDWARD WESTON, of Newark, Essex county, New Jersey, have invented a new and useful Improvement in Electrical Measuring-Instruments, of which the following is a specification.

My invention relates to an instrument for the measurement of current strength or pressure. It depends upon the principle that a wire when heated by a current passing through it will expand, and that the extent of expansion or elongation bears a relation to the current strength or pressure.

My invention consists in an entirely novel construction and arrangement of an instrument embodying the foregoing principle, in which I am enabled to use a shorter and thinner wire than has hitherto been employed, to do away with the disturbing effects of tension on the wire, and frictional resistance to its expansion, to greatly improve the portability of the apparatus, and to render it operative with far less current than has hitherto been employed, and hence at a much reduced expense.

In the accompanying drawings, Figure 1 is a plan view. Fig. 2 is a side elevation of the index actuating mechanism and Fig. 3 is a side elevation of one of the supporting posts which carry the rollers over which the wire passes.

Similar numbers of reference indicate like parts.

1 is the base of the instrument. 2 is a bracket thereon, having arms 3 and 4. The inner arm 4 receives a step 5 which rests upon the fixed pin 6. In the upper arm 3 is a thumb-nut 7, which carries a bent arm 8. To the end of arm 8 is connected one end of the spiral spring 9. The other end of said spring is connected to an arbor or spindle 10, which is pivoted in the step 5 and also in the step 11, which is held in the thumb-nut 7. By turning the thumb-nut 7, the spring 9 may be tightened or loosened as desired, and the torque of the spindle or arbor 10 thus modified, as desired. The arbor 10 carries an index needle 12, which extends over the scale 13, which is supported on the base 1.

Disposed around the circumference of a circle described on the base 1, is a number of arms or posts, 14, 15, 16, 17, 18, 19, 20, each of which carries a small roller 21, as shown in Fig. 3. The thin wire 22 passes around the rollers 21. One end of said wire is fastened to the arbor 10, and the other end is attached to a fixed stud 23, upon a plate 24, which is fastened to the base 1. A similar plate 25 also connects with the bracket 2. In the plates 24 and 25 are binding posts 26, 27, as shown. The spring 9 tending to rotate the arbor 10, normally keeps the wire 22 under a slight tension. The circuit in the instrument proceeds from the binding post 26 through the wire 22 to arbor 10, and thence to binding post 27, or vice versa. When the current passes through the wire 22, the wire becoming heated expands. The strain of the wire upon the arbor 10 is thus relaxed and the spring 9 operates to turn said arbor over a distance which is determined by the amount of elongation of the wire. As, in accordance with well-known laws, the elongation of the wire depends upon the temperature to which it is raised, and this temperature in turn depends upon the strength of the current traversing the wire, it follows by observing the extent of movement of the index over the scale, I have here a simple and accurate means of electrical measurement.

I am well aware that electrical measuring instruments have hitherto been made which contain wire to be heated by the current and so caused to expand; and the best known apparatus of that type is open to the following objections.

First. It is very long in shape, lacks portability and requires about twelve feet of wire, or four lengths each of three feet.

Second. Its construction is expensive owing to the fact that multiplying gear is employed.

Third. The wire is looped forward and back over rollers so as to be subject to considerable friction and constant strong tension is required to maintain it at its original length. I have found simple extension of the wire to alter the instrument reading four volts; and in all cases, the wire is reduced in diameter and the needle thrown off the zero line.

Fourth. The tension necessary to overcome the friction prevents the use of thin wire. Hence it requires a strength of current of upward of .3 ampère to operate the instrument. At a pressure of one hundred and ten volts, the energy required is about one-twentieth horse power; so that the apparatus is expensive to use.

In my instrument I have reduced the length of wire to about what is shown in the drawings, which represents a full-sized working apparatus. The improved portability of the device is obvious. Its construction is cheap and simple, and it has no multiplying gear at all. The rollers are so disposed as to offer the minimum frictional resistance, and the wire is under no tension other than such as the spring exerts, and that being no more than is necessary to take up the slack as the wire expands, is practically inconsiderable in its physical effect on the wire. I can make my wire one one-thousandth of an inch in diameter, or even less. The usual diameter of wire in expansion voltmeters is three and one-half one thousandths of an inch. Therefore, the last-named apparatus requires nine times as much current as mine does.

I may make the base 1 of metal and of such form and dimensions that its expansion due to atmospheric changes shall correspond to that of the wire, and thus render the instrument independent of such variation.

I claim—

1. In an electrical measuring instrument operated by the expansion or contraction of an electrical conductor, an elongated conducting body in circuit extending between abutments, and two or more supports between said abutments so located as to cause said conductor in passing over them to form a single open loop.

2. In an electrical measuring instrument operated by the expansion or contraction of an electrical conductor, an elongated conducting body in circuit extending between abutments, two or more supports between said abutments so located as to cause said conductor in passing over them to form a single open loop, and means for varying the tension of said conductor.

3. In an electrical measuring instrument operated by the expansion or contraction of an electrical conductor, an elongated conducting body in circuit extending between abutments, one of said abutments being adjustable to vary the tension of said conductor, and two or more supports between said abutments so located as to cause said conductor in passing over them to form a single open loop.

4. In an electrical measuring instrument operated by the expansion or contraction of an electrical conductor, an elongated conducting body in circuit, a spring abutment, a fixed abutment to which the ends of said body are connected, and two or more supports between said abutments so located as to cause said conductor in passing over them to form a single open loop.

5. In an electrical measuring instrument operated by the expansion or contraction of an electrical conductor, an elongated conducting body in circuit, a fixed abutment to which one end of said body is connected, a rotary shaft to which the other end of said body is connected, a spring connected to said shaft and giving the same an initial torque, and two or more supports between said abutments so located as to cause said conductor in passing over them to form a single open loop.

6. In an electrical measuring instrument operated by the expansion or contraction of an elongated conducting body in circuit, a flexible conductor extending between abutments, and two or more supporting rollers located so that said conductor in passing over them successively shall form a single open loop.

7. In an electrical measuring instrument operated by the expansion or contraction of an elongated conducting body in circuit, a flexible conductor extending between abutments one of which is adjustable to vary the tension of said conductor, and two or more supporting rollers located so that the said conductor in passing around them successively shall form a single open loop.

8. In an electrical measuring instrument operated by the expansion or contraction of an elongated conducting body in circuit, a flat or plane base, two or more supporting rollers disposed in a plane parallel to said base, and in the same plane and a flexible conductor extending between abutments and around said rollers; the said rollers being so located as to cause said conductor in passing around them to form a single open loop.

9. In an electrical measuring instrument a flat or plane base, a series of fixed supports disposed thereon, a roller on each support disposed in a plane parallel to that of the base, a shaft, a means of rotating said shaft, and a fine filament or wire connected to said shaft and to an abutment and extending around said rollers in the form of a single loop.

10. In an electrical measuring instrument a flat or plane base 1, fixed supports, as 14, 15, 16, &c., disposed thereon, rollers 21 carried by said supports, bracket 2, shaft 10, supported by said bracket, spring 9 connected at one end to said shaft, adjusting arm 8 to which the other end of said spring is fastened, a fixed abutment 23 and a fine filament or wire 22 connected at its extremities to said shaft and said abutment and supported by said rollers 21.

EDWARD WESTON.

Witnesses:
R. C. FESSENDEN,
H. R. MOLLER.